United States Patent [19]

Kress et al.

[11] Patent Number: 5,649,794
[45] Date of Patent: Jul. 22, 1997

[54] DRILL

[75] Inventors: Dieter Kress, Aalen; Friedrich Häberle, Lauchheim, both of Germany

[73] Assignee: Mapal Fabrik für Präzisionswerkzeuge Dr. Kress KG, Aalen, Germany

[21] Appl. No.: 436,250
[22] PCT Filed: Nov. 19, 1993
[86] PCT No.: PCT/EP93/03242
  § 371 Date: May 17, 1995
  § 102(e) Date: May 17, 1995
[87] PCT Pub. No.: WO94/12306
  PCT Pub. Date: Jun. 9, 1994

[30] Foreign Application Priority Data

Nov. 21, 1993 [DE] Germany .................. 42 39 257.8

[51] Int. Cl.[6] .................................................. B23B 51/00
[52] U.S. Cl. .............. 408/83; 408/181; 408/233; 408/713
[58] Field of Search ................ 408/83, 181, 185, 408/231–233, 713

[56] References Cited

U.S. PATENT DOCUMENTS

| 3,033,062 | 5/1962 | Carlstedt | 408/83 |
| 3,203,493 | 8/1965 | Bergstrom | 408/180 |
| 4,279,550 | 7/1981 | Kress et al. | 408/197 |
| 4,954,024 | 9/1990 | Kress et al. | 408/197 |

FOREIGN PATENT DOCUMENTS

| 94/12305 | 6/1994 | WIPO | 408/233 |

*Primary Examiner*—Steven C. Bishop
*Attorney, Agent, or Firm*—Anderson Kill & Olick PC

[57] ABSTRACT

A drill including a bit having an extension received in and axially extending groove formed in the end face of the drill base body, a side cutting edge projecting beyond the base body circumference, and two active end cutting edges projecting beyond the end face of the base body, with the drill further including clamping elements for securing the bit extension in the base body groove with a possibility of radial adjustment.

16 Claims, 5 Drawing Sheets

DRILL

BACKGROUND OF THE INVENTION

The invention relates to a drill having a base body, a groove provided in an end face for receiving a bit, a clamping device for retaining the bit, and guide strips provided in the circumference of the base body.

Drills serve for drilling bores in workpieces and can drill a solid material, so that the preliminary machining of a bore is not necessary. To this end, they are provided with cutting edges on the end face which cut off the workpiece material. However, a drawback turned up consisting in that the dimension of so produced bores, on one hand, is very imprecise, i.e. deviates from the desired dimension accuracy and, on the other hand, the surface has an unsatisfactory quality. Therefore, often a further machining of the bore was required before it could be subjected to precise machining. This necessitates use of numerous operational phases, the effecting of which is time-consuming and expensive.

Accordingly, the object of the invention is to provide a drill for machining bores in a solid material the dimensional accuracy and surface quality of which meet very high requirements so that at least some of the finishing steps can be eliminated.

SUMMARY OF THE INVENTION

This object is achieved in a drill of the above-discussed type by providing, according to the present invention, the drill with a bit having a side cutting edge projecting beyond the circumference of the base body. Opposite, it a first guide strip is provided. The width of the bit is so selected that it, in order to form two end face cutting edges, extends beyond the rotational axis of the drill which coincides with the central axis. Thereby, the drill is provided with two end-face cutting edges able to drill bores in a solid material. At least one of these end-face cutting edges extends sideways outwardly of the circumference of the base body of the drill and serves for machining the surface of the formed bore. At that, the forces applied to the bit or to the drill are taken up by the oppositely located first guide strip, whereby a very precise machining of the bore surface is insured so that, on one hand, a very good dimensional accuracy and, on the other hand, a very good surface quality are achieved.

According to an advantageous embodiment of the invention, it is provided that the bit is arranged in the groove for radial displacement relative to the rotational axis. Thereby, it becomes advantageously possible to displace the bit radially relative to the base body, whereby the position of the bit with respect to the oppositely arranged guide strip can be exactly provided. In particular, thereby the bore dimension can be exactly set as a distance between the guide strip and the oppositely located cutting edge. Also, thereby, the change of the dimension because of wear can be compensated.

According to a further advantageous embodiment of the invention it is provided that the bit has an extension extending axially into the base body and cooperating with a clamping and/or adjusting device. Thereby it becomes possible to provide the bit with an area which simultaneously can be used for fixing the bit in the base body and for effecting the radial displacement of the bit. The bit can thereby be formed very simply because additional locking surfaces for the bit need not be provided.

According to a further preferred embodiment of the invention, it is provided that the extension has active surfaces which, advantageously, extend at an angle, different from a right angle, to a radial plane extending through the groove, and further preferably extend at an angle to the rotational axis. By this particular shaping of the clamping surfaces, it is possible to achieve a reliable tightening of the bit because the tightening forces, which act on the bit, do not coincide with the possible displacement directions of the bit in the groove.

A particularly preferred embodiment of the drill is one in which the first guide strip is so arranged that it extends practically over the entire height of the bit measured in the direction of the rotational axis of the drill. With this, the forces applied to the tool through the cutting edge projecting beyond the circumference of the drill are removed particularly well, without deviation of the bit of the drill. This results in very good dimensional accuracy and surface quality of the formed bore.

Further is preferred an embodiment of a drill in which a second guide strip is associated with the side cutting edge of the bit which projects beyond the circumference of the base body, and a third guide strip is associated with the first guide strip, which, when seen in the rotational direction, trail, respectively, the cutting edge or the first guide strip. The additional guide strips provide for particularly good guidance and stabilization of the tool in the bore, so that particularly good results are achieved during drilling.

A most preferred embodiment of a drill is one in which the bit is formed as a reversible bit. In this way, the bit can be used at least twice. After wear of the cutting edges provided on the end face and of the cutting edge, which projects beyond the circumference of the base body, the it is turned about an axis extending transverse to the rotational axis of the drill, so that the previous end face cutting edges are located below, at the bottom of the bit-receiving groove. The previously unused cutting edges, which were located there, can now be used for further drilling with the drill. The relatively expensive material of the bit is thereby effectively utilized.

A further embodiment of the drill is preferred in which the bit-receiving groove is so formed that the bit can be supported against the bottom of the groove with an outer edge arranged opposite the end face. In this way, the forces, which are generated during machining of a workpiece are optimally taken up by the drill base body.

Finally, an embodiment of a drill is preferred in which the side edge of the bit opposite to the cutting edge, which project sideways of the drill base body, is supported against a side limiting surface of the bit-receiving groove. Advantageously, the bit is supported directly against the inner surface of the first guide strip, so that the reaction forces can be transmitted through the guide strip directly to the bore wall, and a very good guidance of the drill is insured.

Further embodiments of the drill follow from the remaining subclaims. The invention will be explained in more detail below with reference to the drawings. The drawings show:

DETAILED DESCRIPTION OF THE PREFERRED EMBODIMENTS

Figure 1:
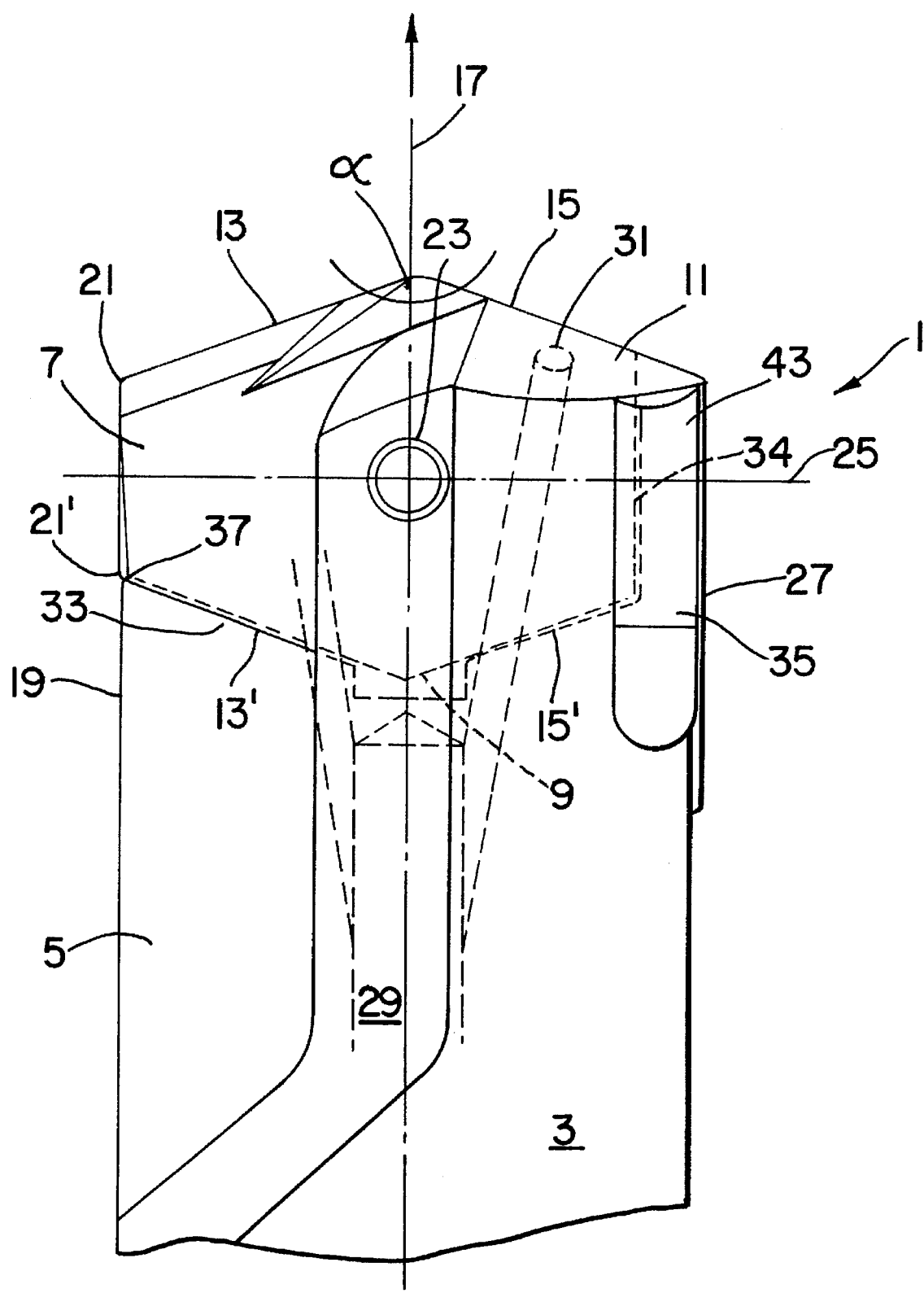
FIG. 1 a first side view of a front portion of a drill.

The side view of a front portion of a drill 1, which is shown in FIG. 1, will be defined as a front elevation view. It shows a front end of a drill the rear end of which can extend into a shaft serving as a clamping element of a machine-tool. The base body 3 of the drill 1 is formed substantially as a regular cylinder. At the left side, there is provided a segmented recess, e.g., a milled one, which serves for forming a chip removal space 5. In the region of the chip removal space, a bit 7 is provided which is fixed in a side groove 9 formed in the base body 3 of the drill 1. The bit 7 projects beyond the end face 11 of the drill 1, so that two cutting edges 13 and 15 are formed at the end face which during machining of a work piece, cut the bottom of a bore so that the drill 1 can be used for machining of a solid blank.

The cutting edges 13 and 15 form an obtuse angle α that lies within the range from about 140° to 170° and preferably is about 155°. Both cutting edges 13 and 15 intersect each other at the rotational axis 17 of the tool which coincides with the central axis of the drill 1. As shown in FIG. 1, the cutting edges 13 and 15, at some distance from the rotational axis 17, can taper off steeply in the region bordering the rotational axis 17, so that here an angle from 125° to 155°, preferably about 140°, is formed.

The left cutting edge 13 of the bit 7 extends beyond the circumference 19 of the drill and, thus, forms a side cutting edge 21. The bit 7 extends beyond the circumference 19 of the tool only at one side so that while there are provided two end face active cutting edges 13 and 15, only one active side cutting edge 21 is provided.

Thus, the tool, e.g., the drill 1 functions, at is end face, as a so-called double-cutting tool and, in the region of its circumference, as a so-called single cutting tool.

Because the bit 7 is formed so wide that it extends from the side cutting edge 21 beyond the rotational axis 17, the centering of the tool takes place inside the bore and results from the fact that the cutting edges 13 and 15 should apply opposite cutting forces which, because of the different lengths of the cutting edges 13 and 15, do not completely compensate each other. However, a greatest possible force compensation can be insured by making the length of the cutting edges 13 and 15 as close to each other as possible.

FIG. 1 shows that opposite the cutting edges 13 and 15, identical cutting edges 13' and 15' are provided, i.e., the bit 7 is formed as a reversible bit. Correspondingly, a side cutting edge 21' is provided opposite the side cutting edge 21, as can be seen at the left side of FIG. 1. In the drill 1 shown in the drawings, the bit 7 is provided with a central hole 23 through which a suitable fixing element, e.g., a clamping screw extends. A transverse axis 25 extends through the center of this hole and intersects in this center the rotational axis 17. Upon the rotation of the bit 7 about the axis 25 by 180°, the cutting edges 13' and 15' are exposed, projecting beyond the end face 11 of the drill 1, while the cutting edges 13 and 15 take place of the cutting edges 13' and 15'.

Opposite the cutting edge 21, there is provided a guide strip 27 which takes up reaction forces, generated by the cutting edge 21 and is guided along the wall of the machined bore. The first guide strip 27 is advantageously so formed that it extends in the direction of the rotational axis 17 along the entire height of the bit 7 and that its front edge, during displacement of the drill 1 in the direction indicated by an arrow, is located somewhat behind the side cutting edge 21. Thus, in the direction transverse to the rotational axis 17, the frontmost edge of the first guide strip 27 lies somewhat beneath the side cutting edge 21. Thus, immediately after the engagement of the side cutting edge 21, the first guide strip 27 engages the wall of the machined bore and takes up the reaction forces. Thereby, an optimal guiding of the drill 1 in the machined bore is provided so that, on one hand, a very good dimensional accuracy and, on the other hand, an increased surface quality are achieved.

As shown in FIG. 1, the drill 1 can be provided with means for feeding a cooling medium thereto which, e.g., can include a central feeding channel in the bore 29 of the base body 3 and into which opens a channel 31 which also opens at the end face 11 of the drill 1.

The bit-receiving groove 9 has a first support surface 33 arranged leftward of the rotational axis 17. The bit 7 abuts it in the regions which are, advantageously located immediately adjacent to the cutting edge 13'. In the region below the cutting edge 15', in FIG. 1, the bit 7 lies free, i.e., it does not contact the bottom of the groove 9. The rightside edge 34 of the bit 7, which is located opposite the side cutting edge 21, abuts a second support surface 35 which, e.g., can be formed by the backside of the first guide strip 27.

Figure 7:
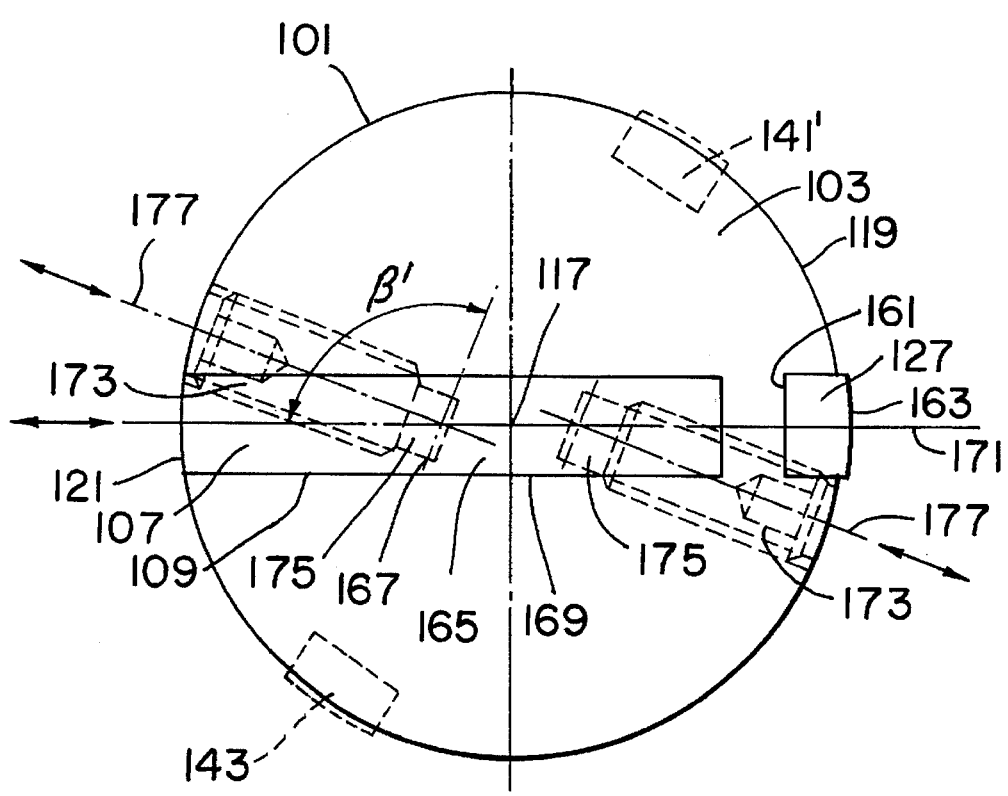
FIG. 7 a front view of the drill of FIG. 6.

FIG. 1 shows that the leftside peripheral edge of the bit 7, which extends from the side cutting edge 21, is somewhat set back in the direction of the rotational axis 17, whereby the side cutting edge 21 forms the outmost region of the bit 7 opposite of which, as shown in FIG. 7, the most set back region 37 is located. The leftside edge of the bit 7 extends parallel to the right side edge 34 of the bit 7.

Figure 2:
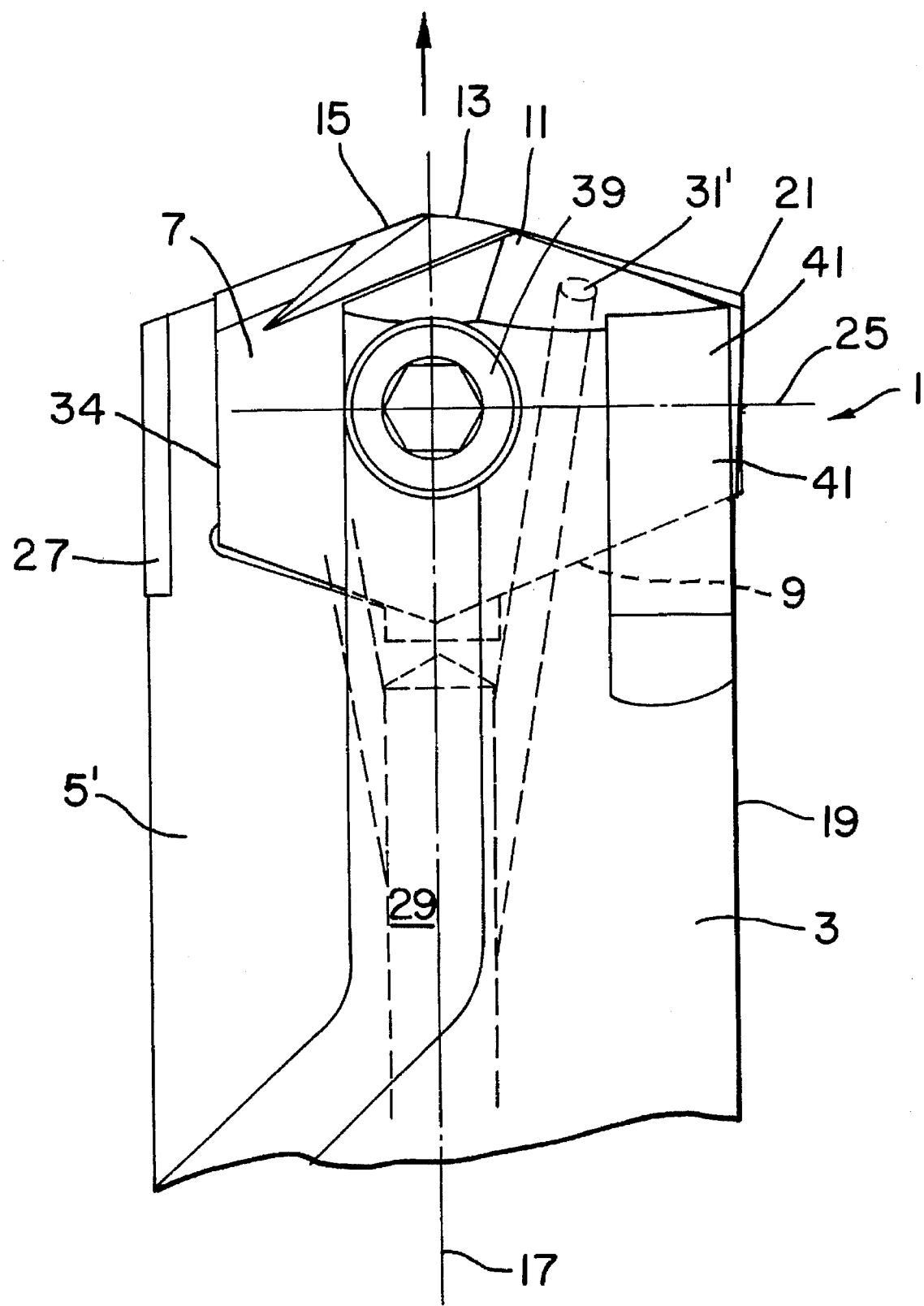
FIG. 2 a second side view of the front portion of the drill in which it is turned by 180° relative to the view of FIG. 1.

FIG. 2 shows a rear view of the front portion of the drill 1 shown in FIG. 1. The elements identical to those of FIG. 1, are designated with the same reference numerals, so that a reference to the description above can be made.

FIG. 2 shows how the bit 7 is inserted in the groove 9 formed in the end face of the base body 3 of the drill. The bit 7 is so held with a clamping screw 39 that the two cutting edges 13 and 15 project beyond the end face 11 of the drill 1. Likewise, the side cutting edge 21 projects beyond the circumference 19 of the drill 1. The side edge of the bit 7, associated with the side cutting edge 21, extends parallel to the oppositely provided side edge 34 of the bit 7.

In the base body 3 of the drill 1, there is also provided, at this side, free space defining a chip removal space 5' through which the chips, which are cut off with the cutting edge 15, can be removed.

Adjacent to the side cutting edge 21, a second guide strip 41 is provided in the circumference 19 of the drill 1. Correspondingly, as shown in FIG. 1, adjacent to the first guide strip 27, a third guide strip 43 is provided in the circumference 19 of the drill 1.

A cooling medium channel 31', shown with dash lines, extends from the feed channel 29 and opens into the end face 11 of the drill 1. The cooling medium, on one hand, serves for lubricating and cooling the tool and, on the other hand, serves for carrying away chips formed during machining.

FIG. 2 makes again especially clear that the first guide strip 27 extends, in the direction of the rotational axis 17, along the measured height of the bit 7. It can be formed as long as the second guide strip 41 and the third guide strip 43. The second and third guide strips, however, can be formed shorter than the first guide strip as, e.g., shown in the further discussed FIG. 3.

Figure 3:
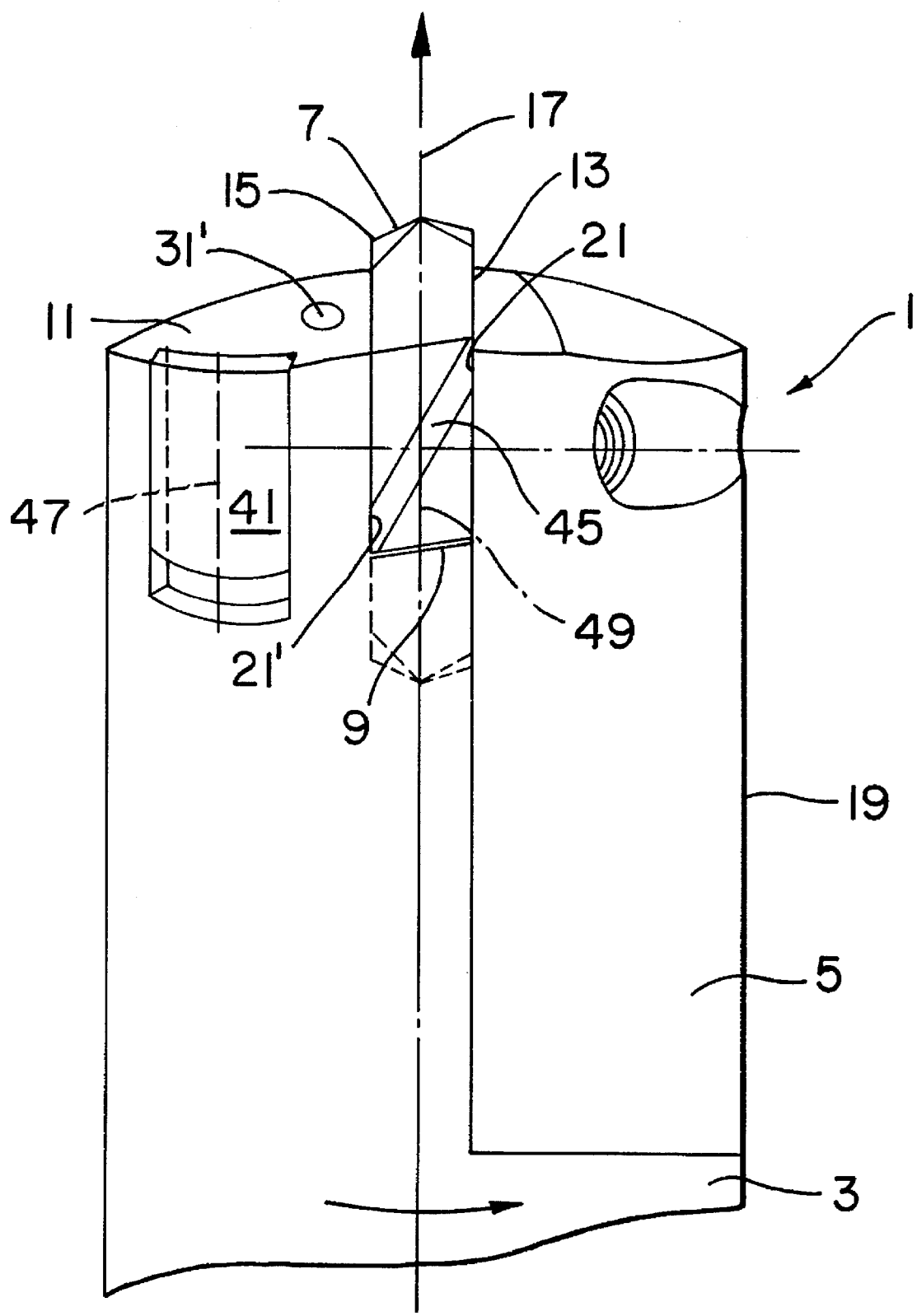
FIG. 3 a leftside view of the drill according to FIG. 1.

FIG. 3 shows a side view of the front portion of the drill 1 and represents actually, a plan view of the side of the bit 7 with the cutting edge 21. The elements, discussed with reference to FIGS. 1 and 2, have the same reference numerals so that a reference to their above description can be made.

The schematic view of FIG. 3 shows that the side edges 13 and 15 of the bit 7 project beyond the end face 11 of the drill 1 and lie on opposite sides of the bit 7, and it is understood that the tool, during its axial displacement in the direction indicated with an arrow, i.e., upward, rotates clockwise, so that the side cutting edge 21, in FIG. 3, moves from left to right and, thereby, cuts off chips from the bore wall. Correspondingly, in FIG. 3, the cutting edge 13 likewise moves from left to right, and the cutting edge 15 moves in an opposite direction, from right to left.

The chips, which are cut off with cutting edge 13 and the side cutting edge 21, are removed through the chip space 5.

The rear view of the side surface of the bit 7 shows that its regions have different heights. A tapering-off region adjoins the side cutting edge 21, the region which in the plane of the drawing tapers off and represents, thus, a taper. A lower side cutting edge 21', which lies diametrically opposite of the side cutting edge 21, lies at the same height as the side cutting edge 21. Adjoining it, at the right of FIG. 3, is again a tapering-off region which, in the plane of the drawing, slops downwardly and represents a cutting edge taper. Thus, diagonally across the side surface of the bit 7 extends a region having practically the same height and designated with a reference numeral 45. The region extends substantially parallel to the bore surface when the drill is inserted into the bore.

FIG. 3 shows that the second guide strip 41 trails the cutting edge 21 in the rotational direction, indicated with an arrow in FIG. 3. The central axis 47 of the second guide strip 41 is, therefore, spaced from the central axis of the bit 7 which coincides with the rotational axis 17.

FIG. 3 clearly shows that the bottom side of the bit 7 lies on the bottom of the groove 9 which defines the first support surface 33, as it was explained with reference to FIG. 1.

Figure 4:
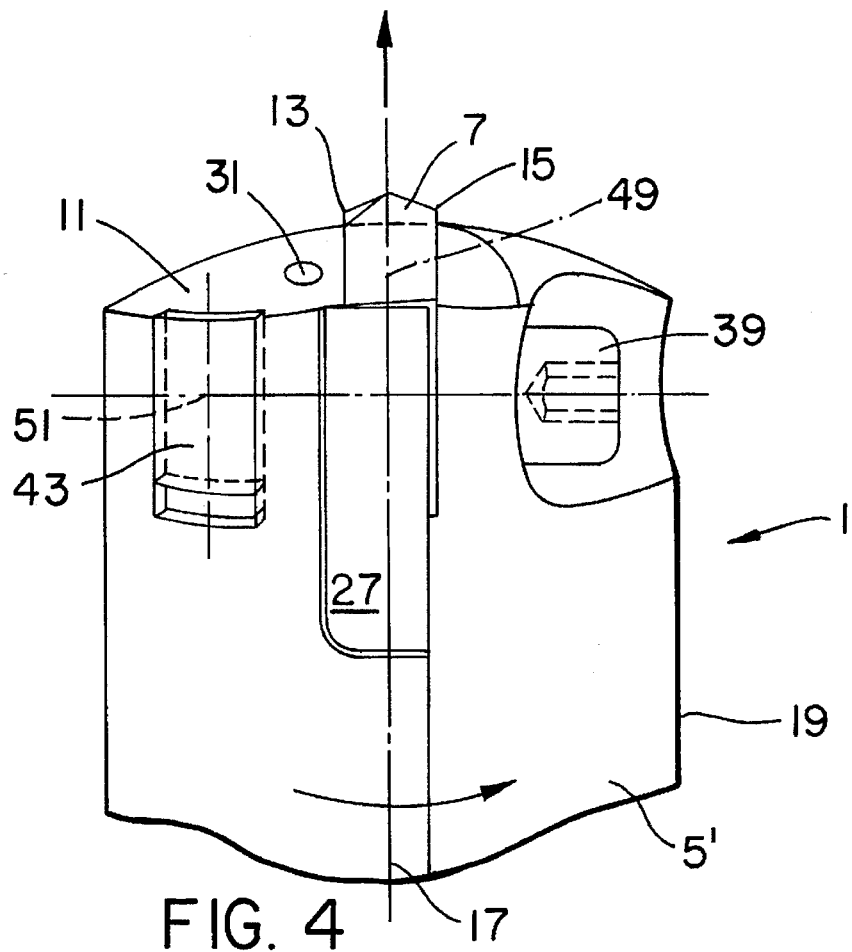
FIG. 4 a rightside view of the drill according to FIG. 1.

FIG. 4 shows a view of the drill 1 opposite to that of FIG. 3. Here likewise, the same elements are designated with the same reference numerals so that a reference to the above description can be made.

The first guide strip 27 is shown particularly clearly in FIG. 4 and is arranged opposite the side cutting edge 21 shown in other figures and, during machining of a bore, takes up forces applied to the side cutting edge. The width of the guide strip 27 is somewhat bigger than the thickness of the bit 7. Spaced from the second guide strip 41, there is provided a third guide strip 43 the central axis 51 of which is spaced from the central axis 49 of the bit 7 which coincides with the rotational axis 17 of the drill 1. During the displacement of the drill 1 in the direction indicated with the arrow, the tool rotates clockwise. The rotational direction of the tool is indicated with an arrow in FIG. 4. In FIG. 4, the cutting edge 15 of the FIG. 7 moves from left to right and, correspondingly, the cutting edge 13 moves from right to left.

The chips, which are cut off with the cutting edge 15 provided in the end face, are removed through the chip space 5'.

Figure 5:
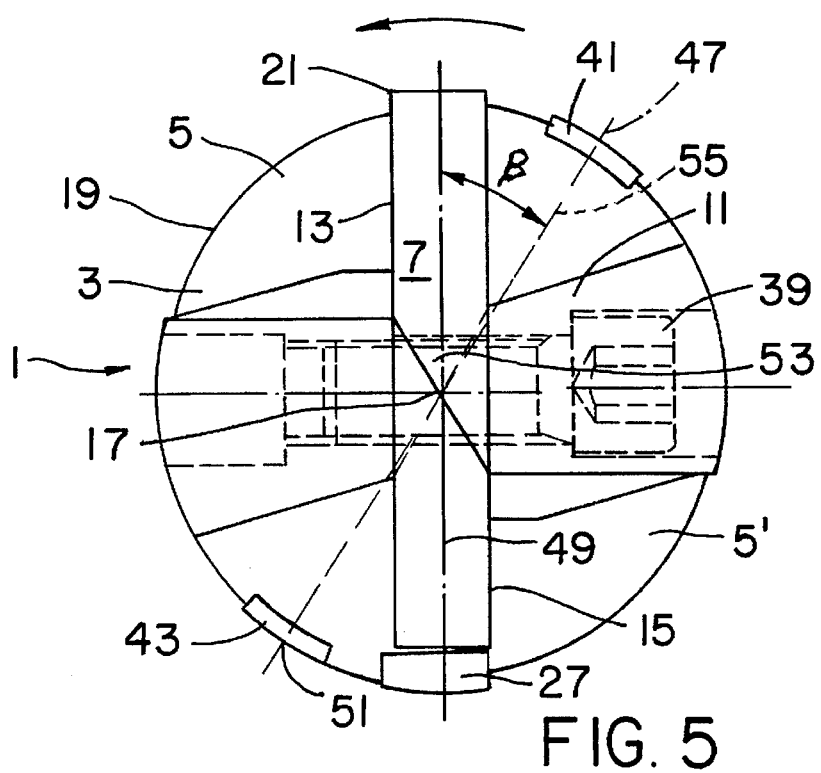
FIG. 5 a front view of the drill.

Finally, FIG. 5 shows a front view of the end face 11 of the drill 1 described with reference to FIGS. 1 through 4. The same elements are designated with the same reference numerals, so that a reference to the above description can be made.

The drawing shows that the bit 7 projects beyond the circumference of the base body 3 of the drill 1 only at one side and has a side cutting edge 21. In the region extending above the end face 11 of the drill 1, cutting edges 13 and 15 are formed, with which the chip spaces 5 and 5' are associated. During machining of a work piece, cut-off chips are removed through these chip spaces. Upon the rotation of the tool, in the view shown in FIG. 5, the side cutting edge 21 and the cutting edge 13 rotate counter-clockwise, as shown with an arrow.

Because the bit 7 extends beyond the rotational axis 17 of the drill 1, i.e., it extends from the side cutting edge 21, preferably, up to the first guide strip 27, in order to achieve an optimal compensation of forces, a so-called cut-out 53 is provided in the region of the rotational axis 17, which is conventional in cutters when they extend beyond the rotational axis of a tool.

The drawing further clearly shows that the first guide strip 27 is located opposite the bit 7 on which a side cutting edge is provided. Trailing the side cutting edge 21 in the rotational direction is a second guide strip 41, with the third guide strip 43 following the first guide strip 27 in the rotational direction. The thickness and the width of the guide strips are selected in accordance with prevailing conditions. The second guide strip 41, as shown in FIG. 5, is located opposite the third guide strip 43, with the connection line of the central axes 47 and 51 of the second and third guide strips 41 and 43, respectively, intersecting the rotational axis 17. The imaginary connection line 55 forms with the central plane 49 of the bit 7, which intersects the rotational axis 17, an angle $\beta$ from 20° to 60°, preferably from 30° to 40°, in particular of about 45°.

A corresponding angle is formed for the guide strip 43 which trails the first guide strip 27.

The drill 1 functions in the following manner:

After the initiation of the rotation of the drill, it is brought into engagement with a stationary workpiece. However, it is also possible to keep the drill stationary and to rotate a workpiece around it.

The cutting edges 13 and 15 of the bit 7, which project beyond the end face of the drill 1, are brought into engagement with solid material and start to machine a bore in the workpiece. In the process, the drill operates as a double cutting tool. The side cutting edge 21 machines the regions of the formed bore which lie in the vicinity of the future bore wall. Here, the drill functions somewhat as a reamer which is formed as a single cutting tool. Because the cutting edges 13 and 15 have, preferably, similar lengths, the drill self-centers in the workpiece. The forces generated by the side cutting edge 21 are taken up by the first guide strip 27. Advantageously two additional guide strips, the second guide strip 41 and the third guide strip 43, are provided, which guide the drill 1 particularly well in the formed bore, so that, on one hand, very good dimensional accuracy and, on the other hand, an optimal surface quality of the bore are achieved. With reduced machining requirements, the third guide strip 43 can be dispensed with. When the end-face cutting edges 13 and 15 or the side cutting edge 21 become worn off, the bit 7 is released. E.i., the lower cutting edge 13', 15' and 21' are transferred to the upper position, by being rotated about the axis 25 by 180°, and then engage the machined work piece. The bit 7 is used as a reversible bit. To this end, it is formed symmetrical with respect to the axis 25, as shown in FIGS. 1, 2 and 3.

Figure 6:
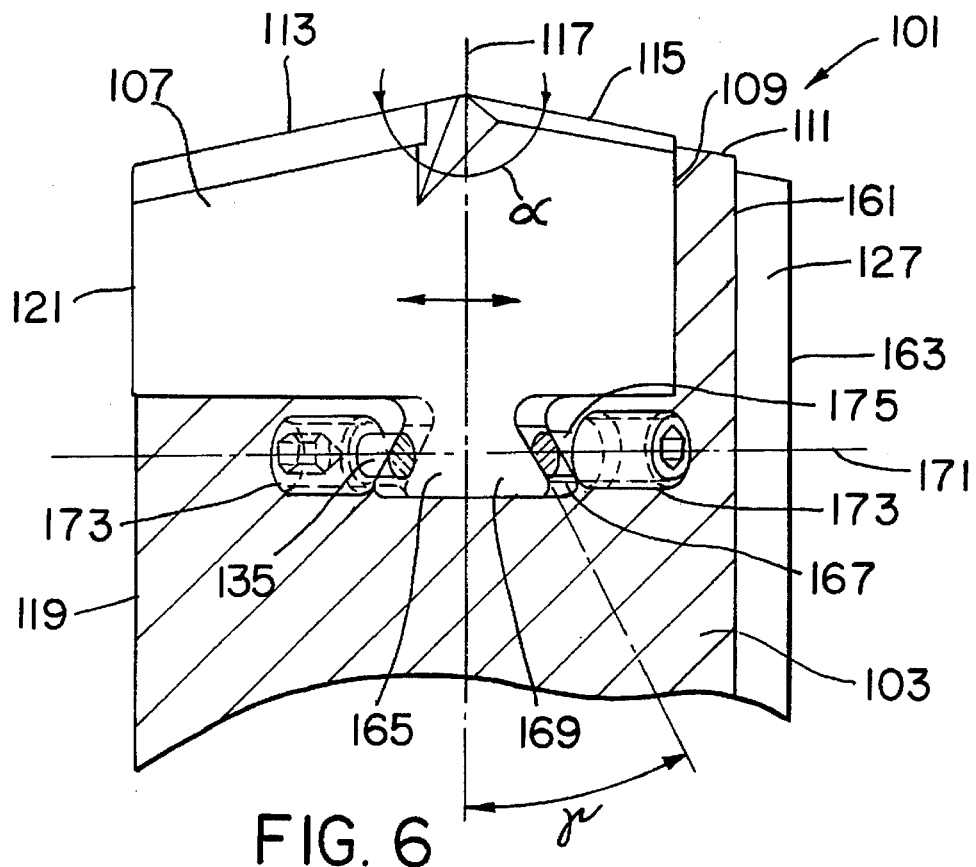
FIG. 6 a side view of a front portion of another embodiment of a drill.

FIG. 6 shows a side view of a drill 101 in which for a better clarity, some portions are shown in perspective. The drill has a base body 103 formed substantially as a regular cylinder. A groove 109, shown only schematically, is formed in the base body 103 for receiving the bit 107. The groove 109 is formed in the end face of the base body 103, so that the bit 107 projects beyond the end face 111. At the end face, the bit 107 has two cutting edges 113 and 115. The cutting edges 113 and 115 intersect each other at the central axis of the drill 101 which coincides with a rotational axis 117 of the tool. The cutting edges 113 and 115 form an obtuse angle α therebetween.

The cutting edge 113 of the bit 107 projects beyond a circumference 119 of the base body 103 and forms thereby a side cutting edge 121. A guide strip 127 is arranged opposite the cutting edge 121. The guide strip 127 is engaged in a longitudinal groove 161 and has its outer end portion projecting beyond the circumference 119 of the base body 103.

In FIG. 6, the section area of the base body 103 is located behind the bit 107 and the guide strip 127, so that here the projection of the cutting edge 121 or the end portion 163 beyond the circumference 119 is not shown to scale.

With regard to the function of the elements of the drill 101, the reference can be made to the description made with reference to FIGS. 1-5, so that repetitions are avoided.

The bit 107 has an axial extension 165. The extension 165 is provided in the region of the rotational axis 117. The extension 165 has a dovetailed shape, with active surfaces 167 and guide surfaces 169 being formed. The guide surfaces 169 extend parallel to the groove 109 so that the bit 107, together with the extension 165, is displaceable in the groove 109.

The active surfaces 167 extend at an angle β' to a radial surface 171 extending through the groove 109. Simultaneously, the active surfaces 167 extend at an angle γ to the rotational axis 117. Because of this arrangement of the active surfaces, they, as should be clear from the perspective view of the extension 165, rotate relative to the bit 107. In another embodiment, the angles β' and γ can obviously be 90° or 0° so that the extension 165 in this case is formed as a simple lug.

For receiving the axial extension 165, the groove 109 can have a recess (not shown) provided in its bottom. The recess, in the longitudinal direction of the groove 109, is larger than the extension 165, so that the bit 107 can be displaced radially, as shown with a double arrow in FIG. 6.

Inside the base body 103, tightening screws 173 are provided which, in the example shown, have a hexagonal socket for enabling their displacement. Obviously, other forms of the tightening screws 173 can be used. The tightening screws 173 have an axially extending tightening bodies 175 displaceable toward the active surfaces 167 of the extension 165. The end portions of the tightening bodies 175, which are located opposite the active surfaces 167, have a profile corresponding to that of active surfaces 167, so that a largest possible contact area between the tightening bodies 175 and the active surfaces 167 is provided. According to another embodiment (not shown), the tightening bodies 175 can have outer threads engaging corresponding inner threads of the extension 165.

In the front view of the drill 101 shown in FIG. 7, the elements corresponding to those of FIG. 6, are designated with the same reference numerals and are not further discussed.

It is clear that the bit 107 is arranged in the groove 109 provided in the end face of the base body 103. The tightening screws 173 are so arranged that their axes 177 extend parallel to an imaginary radial line extending through the rotational axis 117.

The tool shown in FIGS. 6 and 7 functions as follows: Upon rotation of the tool and, therefore, of the base body 103, the end-face cutting edges 113 and 115 machine the solid material of the work piece, while the side cutting edge 121 machines the side surface of a bore machined with the cutting edges 113 and 115. The guide strip 127, which is located opposite the cutting edge 121, takes up the reaction forces generated by the cutting edge 121 and transmits them to the wall of the formed bore. For centering of the drill 101 and an optional removal of reaction forces, it is advantageous that the bit be adjustable. Only in this case, an exact dimensional accuracy of a drill can be achieved. With this, the bit 107 can be precisely adjusted with the tightening screws 173. The tightening screws 173 are displaced dependent on the directions in which the bit 107 should be displaced, which are indicated with a double arrow associated with the bit 107 and shown in FIG. 7. If, for example, the tightening screw 173, which is shown at the left of FIG. 7, is released, i.e., is partially unscrewed, the pressure of the tightening body 175 is relieved. In the embodiment in which the tightening body 175 forms an extension of the tightening screw 173, it would be correspondingly withdrawn. By subsequent actuation, i.e., screwing in of the tightening screw 173, the tightening body 175 will apply a force to the active surface 167 of the extension 165. As a result of application of this tightening force, the bit 107 will be displaced in the groove 109 along the guide surfaces 169. This displacement will continue until the active surface 167, shown in FIG. 7 on the left, again contacts the tightening body 175 with which it is associated. By tightening both tightening screws 173, the bit 107 is stopped, i.e., fixedly secured.

By this radial displacement of the bit 107, the distance of the active cutting edge 121 with respect to the outer surface of the oppositely located guide strip 127 can be precisely adjusted. The adjustment is effected until a desired diameter of the drill and, thus, of the bore is achieved, which is determined by the preset desired spacing between the active cutting edge and the outer surface of the opposite guide strip. The two tightening screws 173 make the radial displacement of the bit 107 in opposite directions possible.

During operation of the drill 107, the cutting edge 121 wears off. This can be compensated by radial displacement of the bit 107, so that each time a desired diameter can be established. Thereby, the drill 101 is able, even during a very long service life, to produce exactly adjustable bored holes. If needed, a replaceable guide strip 127 and, thereby, a different new projection of the outer end portion 163 beyond the circumference 119, can be used. Finally, it is possible, by radially displacing the bit 107, to compensate manufacturing tolerances associated with the forming of the bit 107, and/or the guide strip 127, and/or the grooves 109 and 161.

FIG. 7 shows that the drill 101 can have several guide strips. In addition to the guide strip 127, first and second guide strips 151' and 143' can be provided. Both are shown in FIG. 7 with dash lines. With regard to the arrangement of these guide strips 141' and 143', a reference to the corresponding description of the arrangement of the guide strips 41 and 43, shown in FIG. 5, is made.

We claim:
1. A drill, comprising:
   a base body having an end face and an axially extending groove formed in the end face;
   a bit having an extension received in the axially extending groove, a side cutting edge projecting beyond a cir- cumference of the base body, and two active end cutting edges projecting beyond the end face of the base body; and clamping means for radially adjustable securing the bit extension in the base body groove, wherein the bit extension has opposite active surfaces, and the clamping means comprises at least one tightening body arranged in the base body engaging a respective one of the active surfaces of the bit extension for securing the bit extension in the groove, and means for displacing the tightening body relative to the bit extension for effecting radial adjustment of the bit.

2. A drill according to claim 1, wherein the axially extending groove is formed in a region of a rotational axis of the drill.

3. A drill according to claim 2, wherein the tightening body is substantially radially displaceable.

4. A drill according to claim 3, wherein the displacing means comprises a tightening screw arranged in the base body for displacing the tightening body.

5. A drill according to claim 3, wherein the opposite active surfaces of the bit extension extend at an angle to a radial plane passing through the groove, which is different from right angle.

6. A drill according to claim 3, wherein the opposite active surfaces extend at an angle to the rotational axis of the drill.

7. A drill according to claim 1, wherein the bit extension has opposite surfaces extending parallel to groove walls and formed as guide surfaces.

8. A drill according to claim 2, wherein the base body groove has a recess formed in a groove bottom, and the bit extension has a portion extending into the recess for longitudinal displacement therein.

9. A drill according to claim 1, further comprising a first guide strip provided in the circumference of the base body opposite the side cutting edge.

10. A drill according to claim 9, wherein the first guide strip extends substantially over an entire axial height of the bit.

11. A drill according to claim 9, further comprising a second guide strip provided in the circumference of the base body, the further guide strip trailing in the rotational direction of the side cutting edge or the first guide strip.

12. A drill according to claim 11, further comprising a third guide strip provided in the circumference of the base body and extending opposite the second guide strip.

13. A drill according to claim 12, wherein the first guide strip has a width which is at least equal to a bit thickness, and the second and third guide strips have each a width at most equal to the width of the first guide strip.

14. A drill according to claim 1, wherein the bit has a side edge located opposite the side cutting edge and extending parallel thereto.

15. A drill according to claim 1, wherein the end cutting edges form an obtuse angle.

16. A drill according to claim 9, wherein an end cutting edge which is remote from the side cutting edge, extends as close as possible to the first guide strip.

* * * * *